US006346007B2

(12) United States Patent
Yokoi

(10) Patent No.: US 6,346,007 B2
(45) Date of Patent: Feb. 12, 2002

(54) METHOD FOR MOUNTING A CONNECTOR ON A PANEL AND A CONNECTOR ASSEMBLY

(75) Inventor: Kenichi Yokoi, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/725,023

(22) Filed: Nov. 29, 2000

(30) Foreign Application Priority Data

Nov. 30, 1999 (JP) .......................................... 11-339949

(51) Int. Cl.[7] .......................... H01R 13/73; H02B 1/01
(52) U.S. Cl. ........................ 439/564; 439/248; 439/573
(58) Field of Search ................................ 439/378, 569, 439/552, 544, 248, 247, 573, 564

(56) References Cited

U.S. PATENT DOCUMENTS

| | | | | | |
|---|---|---|---|---|---|
| 2,978,800 | A | * | 4/1961 | Blain | 439/378 |
| 5,028,761 | A | | 7/1991 | Oda et al. | 219/386 |
| 5,092,774 | A | * | 3/1992 | Milan | 439/66 |
| 6,007,363 | A | * | 12/1999 | Renk | 439/378 |
| 6,065,992 | A | * | 5/2000 | Wu et al. | 439/383 |
| 6,142,814 | A | * | 11/2000 | Wu et al. | 439/378 |

FOREIGN PATENT DOCUMENTS

| | | |
|---|---|---|
| JP | 10092524 | 4/1998 |

* cited by examiner

*Primary Examiner*—Brian Sircus
*Assistant Examiner*—Hae Moon Hyeon
(74) *Attorney, Agent, or Firm*—Greenblum & Bernstein, P.L.C.

(57) ABSTRACT

A method of mounting a connector of a pair of connectors that are respectively mounted on a stationary panel and a movable panel, and that engage with one another. A first connector of the pair of connectors is movably mounted on one of the stationary panel and the movable panel via a spring. The first connector has a flange portion that extends outwardly from an outer periphery of the first connector and has a first through hole. A base plate has a second through hole that is aligned with the first through hole. The method of mounting the connector includes integrating the second connector and the base plate into an assembly by inserting a bolt having the spring into the first and the second through holes prior to the second connector being mounted on one of the stationary panel and the movable panel, and then fixing the base plate of the assembly on the one of the stationary panel and the movable panel so as to movably mount the second connector on the one of the stationary panel and the movable panel. The spring can extend between the flange portion and an end of the bolt extending from the flange portion. Thus, the connector mounting operation becomes easier.

8 Claims, 4 Drawing Sheets

(PRIOR ART)

METHOD FOR MOUNTING A CONNECTOR ON A PANEL AND A CONNECTOR ASSEMBLY

BACKGROUND OF THE INVENTION

1. Field of Invention

This invention relates to a method of mounting a connector on a panel. In particular, this invention relates to an improvement of the method of mounting a connector on a panel in an office appliance, such as a copier/duplicator, or a printer, or a household appliance, and the like, which has a cover to an interior that is opened and closed or which has a member that is frequently detached during the time the appliance is out of order. In such situations, the connectors that engage with one another are respectively mounted on a stationary panel and a movable panel, which is opened from and closed to or detached from the stationary panel. This invention further relates to a connector assembly that improves the mounting operation of the connector.

2. Description of Related Art

Conventionally, when connectors engaging with one another are respectively mounted on a stationary panel and a movable panel, such as a cover, which is opened from and closed to or detached from a stationary panel, as shown in FIG. 5, a female connector 2 is fixed on the stationary panel 1, and a male connector 4 is fixed on the movable panel 3, so that the cover may be attached to, opened from and closed to the stationary panel 1. In order to attach the connectors 2 and 4 respectively on the panels 1 and 3, a bolt hole is provided on each of the flange portions 2*a* and 4*a,* which extend outwardly from an outer periphery of connector housing of each of the connectors 2 and 4. Then, bolts 5 and 6 are inserted into bolt holes provided in the panels 1 and 3. The connectors 2 and 4 are fixed on the panels 1 and 3 by fastening with bolts 5 and 6 and nuts 7 and 8.

As described above, when the connectors 2 and 4 are fixed on both of the panels 1 and 3, respectively, and the movable panel 3 is moved toward and abuts the stationary panel 1, i.e. is moved in the direction as shown by an arrow in the FIG. 5, the connectors 2 and 4 engage with each other. However, when a large force is applied to the movable panel 3 when moving it to the engaged position, an impact force between the connectors 2 and 4 become large at the moment of engagement. Depending on the amount of the impact force, the connectors may be damaged.

Accordingly, in a conventional alternative, shown in FIG. 6, a base plate 9 is fixed to the stationary panel 1, and then the female connector 2, is coupled to the base plate 9 using a bolt 10 having a spring. In detail, after the base plate 9 is fixed to the stationary panel 1, the bolt 10 having a coil spring 11 is inserted into a through hole provided in the flange portion 2*a* of the female connector 2, and a through hole provide in the base plate 9. The coil spring 11 extends between the flange portion 2*a* and a bolt head portion 10*a*. Then, a nut 12 is threaded onto the end of the bolt 10 extending from the base plate 9 to secure the connector 2 on the panel 1. On the other hand, the connector 4 is directly fixed on the movable panel 3.

According to the construction as described above, when the movable panel 3 is moved toward the stationary panel 1 so that the connectors 2 and 4 engage with each other, even if a large application force of the movable panel 3 causes a large impact force between the connectors 2 and 4 at the time of engagement, since the connector 2 compresses the spring 11 and connector 2 moves back by the length L as shown in FIG. 6, the impact force can be reduced. Thus, damage to the connector 2 and connector 4 caused by the impact force can be controlled.

However, according to the method of mounting the connector on the panel as described above, when the connector 2 is mounted on the panel 1, since the connector 2 is mounted on the base plate 9 by using bolts having springs after the base plate 9 is fixed on the panel, the mounting operation of the connector to the panel is troublesome and time consuming. Thus, the efficiency of the mounting operation becomes very poor, which results in cost increases.

Further, since parts, such as the base plate, the bolt having the spring, and the nut, should be prepared when the connector is mounted on the panel, the management of parts also become complicated.

Accordingly, the present invention is provided in view of the above-described problems, and an objective of the present invention is to improve the mounting operation of a connector to a panel.

SUMMARY OF THE INVENTION

To achieve the above and/or other goals, the present invention provides a method of mounting a connector of a pair of connectors that are respectively mounted on a stationary panel and a movable panel, and that engage with one another. A first connector of the pair of the connectors is directly fixed to one of the stationary panel and the movable panel. A second connector is movably mounted on the other one of the stationary panel and the movable panel via a spring. The method of mounting the connector includes integrating the second connector with a base plate to form an assembly by using a bolt having the spring, prior to mounting the second connector on the one of the stationary panel and the movable panel, and fixing the base plate of the assembly on the one of the stationary panel and the movable panel so as to movably mount the second connector on the one of the stationary panel and the movable panel. To integrate the second connector with one of the stationary plate and the movable plate, the second connector has a flange portion that extends outwardly from an outer periphery of the second connector and that has a first through hole. The base plate has a second through hole that is aligned with the first through hole in the flange of the second connector. The bolt having the spring is inserted into the first through hole and the second through hole.

Preferably, the spring extends between the flange portion of the second connector and an end of the bolt extending from the flange portion of the second connector. A nut is threaded on the end of the bolt.

Alternatively, the spring can extend between a head portion of the bolt and the flange portion of the second connector. A nut is threaded onto the end of the bolt extending from the base plate.

The second connector, which is movably mounted via the spring, can be provided either on the stationary panel or the movable panel. However, it is preferable to mount the second connector on the stationary panel, and to fixedly mount the first connector, which engages with the second connector, on the movable panel.

When a plurality of connectors are arranged in parallel, it is preferable to integrate the plurality of connectors with a single base plate to form an assembly.

In another aspect of the present invention, a connector assembly is provided. The connector assembly includes a connector having a flange portion that extends outwardly from an outer periphery of the connector and has a first through hole, a base plate having a second through hole that is aligned with the first through hole, an elongate member inserted into the first and second through holes aligned each other, and a spring that is provided around the elongate member and presses that connector toward the base plate so that the base plate and the flange portion contact each other. The spring can be provided so as to extend between the flange portion and a first end portion of the elongate member, or can be provided so as to extend between the flange portion and a second end portion of the elongate member. Furthermore, the elongate member may be formed as a bolt, with the first end being threaded to receive a nut and the second end having a head.

According to the method of mounting a connector of the present invention, the connector is integrated with the base plate and the spring for absorbing an impact force to form an assembly prior to mounting the connector to the panel. Therefore, when the connector is mounted on the panel, the base plate of the assembly is simply fixed to the panel. As a result, the efficiency of the connector mounting operation is substantially improved. Further, because of the reduction of the operational cost, the total cost can be reduced.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following with reference to figures.

Figure 1A:
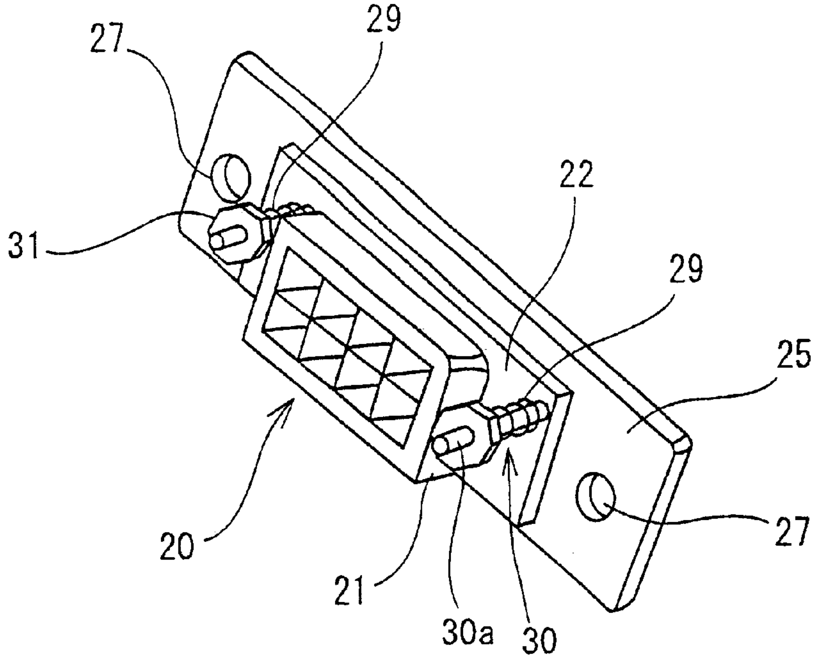
FIGS. 1(A) and 1(B) respectively show a perspective view and a side view illustrating an embodiment according to the present invention.
Figure 1B:
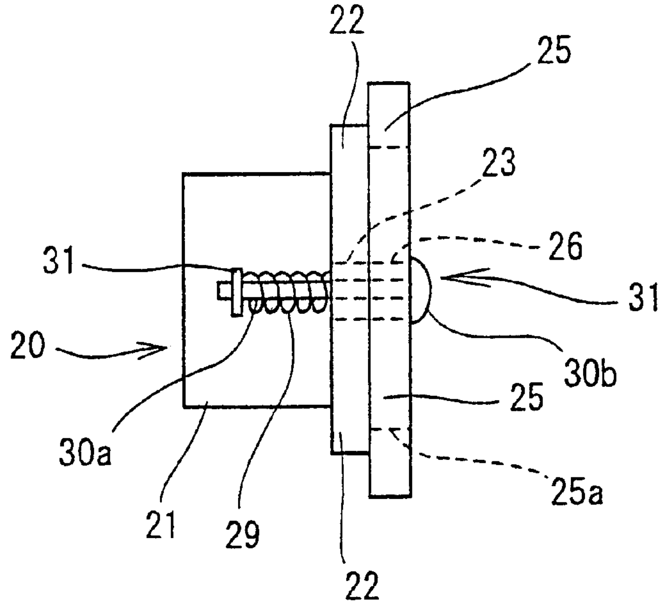

FIGS. 1(A) and 1(B) show a connector assembly, which is integrally assembled prior to the mounting operation of a connector on a panel. The connector assembly has a flange portion 22 extending outwardly from an outer periphery of the connector housing 21 of a female connector (abbreviated as a connector, in the following) 20. A pair of through holes 23 to insert bolts are provided in the right and left sides of the flange portion 22.

A base plate 25, having a size larger than the flange portion 22, is assembled on the surface of the connector 20 facing a panel. The base plate 25 has through holes 26 that are aligned with the through holes 23 in the flange portion 22 of the connector 20. Further, a pair of panel mounting holes 27 are provided in right and left side portions of the base plate 25 extending past the flange portion 22 of the connector 20. In addition, the base plate 25 has a large aperture 25*a* into which a connector 40, which is mounted on the movable panel 3 to engage with the connector 20, can be inserted. The base plate 25 can be made of a resin or a metal.

The connector 20 and the base plate 25 are integrally assembled by using a bolt 30 having a shank portion 30*a* that receives a coil spring 29. In other words, the bolt 30 is inserted into the through hole 26 in the base plate 25 and the through hole 23 in the connector 20. The bolt head portion 30*b* is retained on the base plate 25. The shank portion 30*a* that extends from the through hole 23 receives the coil spring 29. A nut 31 is threaded onto the end of the shank portion 30*a* of the bolt so as to secure the base plate 25 and the panel 1.

By assembling the connector 20 as described above prior to mounting the connector 20 on the panel 1, the connector 20 and the base plate 25 are integrated into a single unit assembly in which the coil spring 29 presses the flange portion 22 toward the base plate 25 so that the flange portion 22 contacts the base plate 25.

Figure 2A:
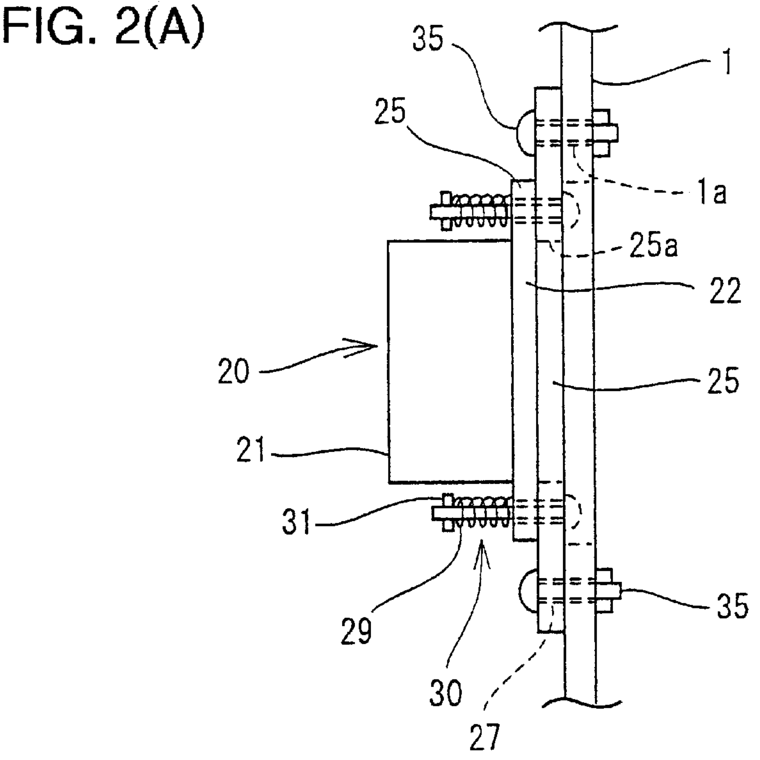
FIG. 2(A) is a side view illustrating a connector mounted on a panel.
Figure 2B:
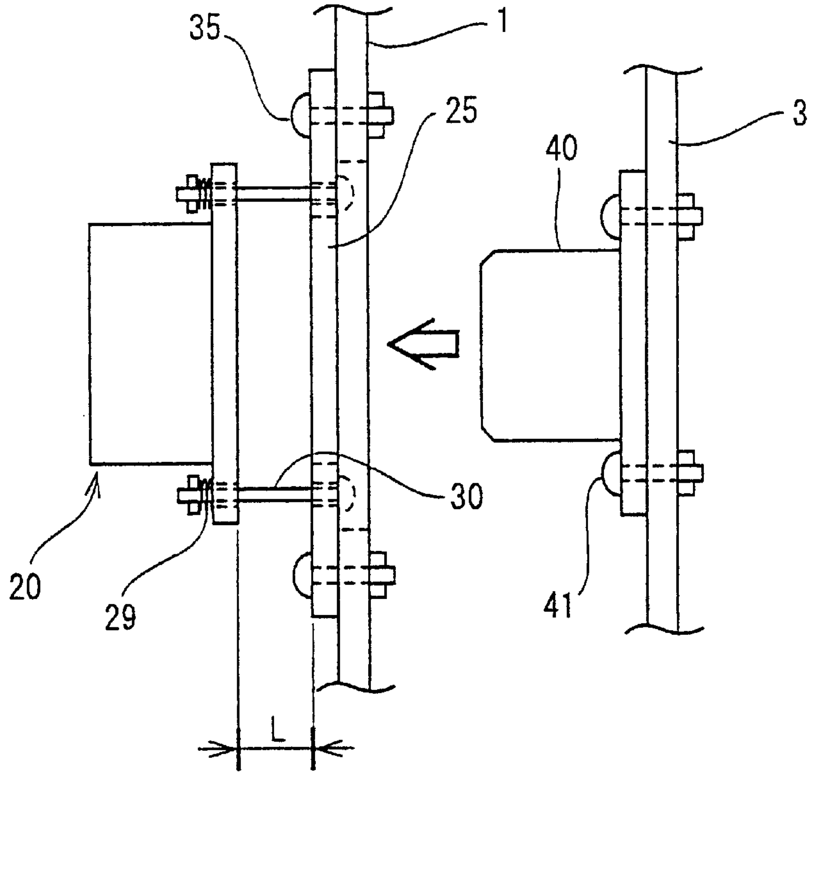
FIG. 2(B) is a side view illustrating connectors mounted on panels to engage with each other.

When the above-described connector 20, which is integrated with the base plate 25, is mounted on the stationary panel 1 as shown in FIG. 2(A), the bolt 35 is inserted into the panel mounting hole 27 provided in the base plate 25 and the mounting hole la in the stationary panel 1. Then, the connector 20 is fastened to the panel 1 with a nut threaded onto the bolt 35. Alternatively, the mounting hole 1*a* in the stationary panel 1 can be provided as a screw hole. In this case, the connector 20 integrated with the base plate 25 is fixed to the stationary panel 1 with a machine screw. As described above, according to the method of mounting the connector on the panel, the connector 20 integrated with the base plate 25 prior to mounting can be easily mounted on the panel by fastening with a pair of bolts. As shown in FIG. 2(B), the male connector (abbreviated as a connector, in the following) 40 is directly fixed to the movable panel 3 by using bolts 41.

According to the construction described above, once the movable panel 3 is opened, and when the movable panel 3 is moved in a direction shown by the arrow in FIG. 2(B), to engage with the stationary panel 1, the connector 40 on the movable panel 3 is inserted into and engages with the connector 20 on the stationary panel 1. At this time, in the event that an operator or a user applies a large force to the movable panel 3, the connector 40 engages with the connector 20 with a large impact force. If this impact force is applied to the connector 20, the connector 20 moves back with the stroke L from the base plate 25 against the bias of the spring 29 to reduce the impact force. Thus, the connectors 20 and 40, which engage with one another, are prevented from being damaged due to the impact force.

Figure 3:
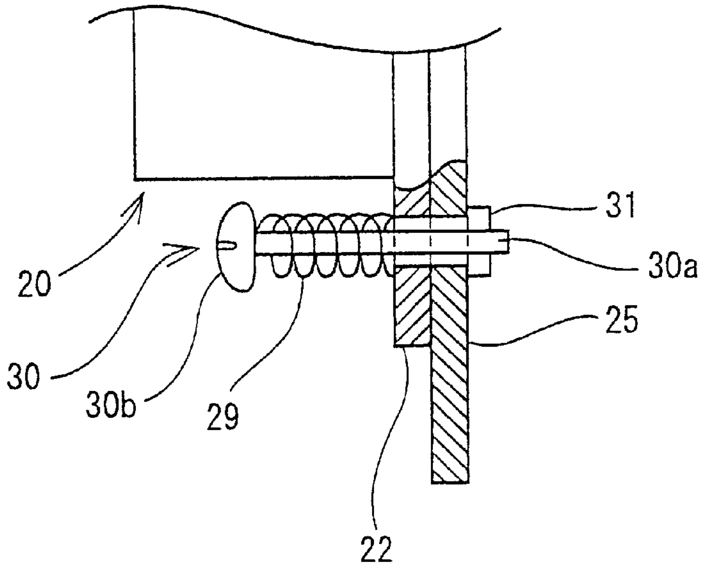
FIG. 3 is a partial cross-sectional view illustrating a modification of the embodiment according to the present invention.

The present invention is not limited to the embodiment described above. Instead, as shown in FIG. 3, the bolt 30 provided with the coil spring 29 therearound in advance, can be inserted into the through hole 23 provided in the flange portion 22 of the connector 20 and the through hole 26 provided in the base plate 25, and then the nut 31 is threaded onto the bolt shank portion 30*a* extending from the base plate 25 so that the coil spring extends between the bolt head portion 30*b* and the flange portion 22. Similarly to the embodiment as shown in FIG. 2(A), the spring 29 presses the flange portion 22 toward the base plate 25 so that the flange portion 22 contacts the base plate.

In the above-described embodiment, the connector 20, which is biased by the spring, is mounted on the stationary panel 1. However, it is possible to mount the connector 40, which is biased by the spring, on the movable panel 3, and to fix another connector 20 on the stationary panel 1 directly.

Figure 4:
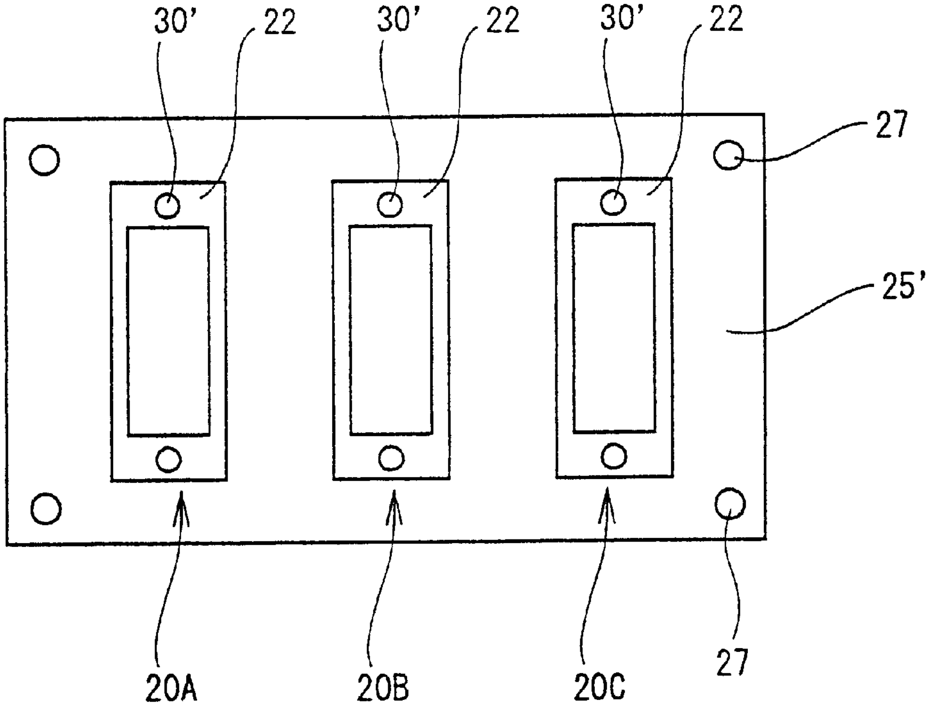
FIG. 4 is a schematic diagram illustrating another modification of the embodiment according to the present invention.
Figure 5:
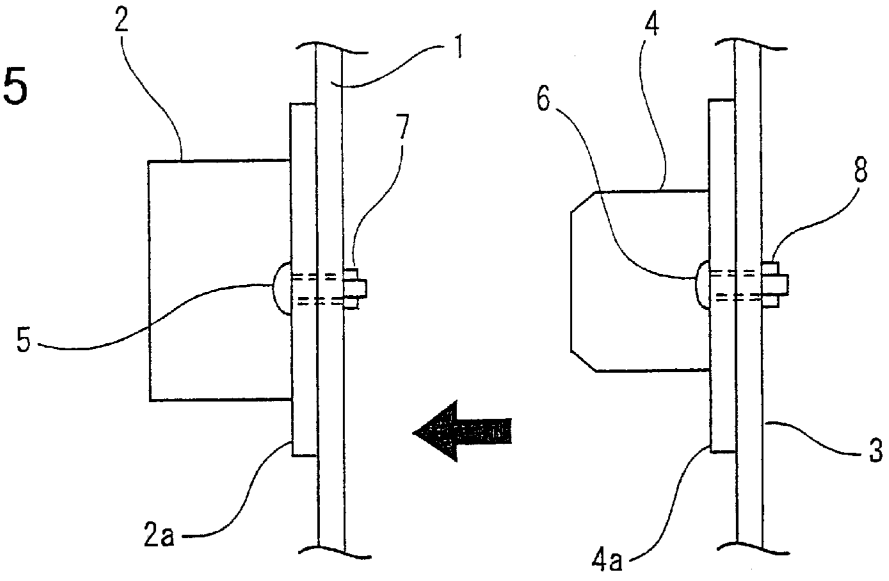
FIG. 5 is a schematic diagram illustrating a conventional construction.
Figure 6:
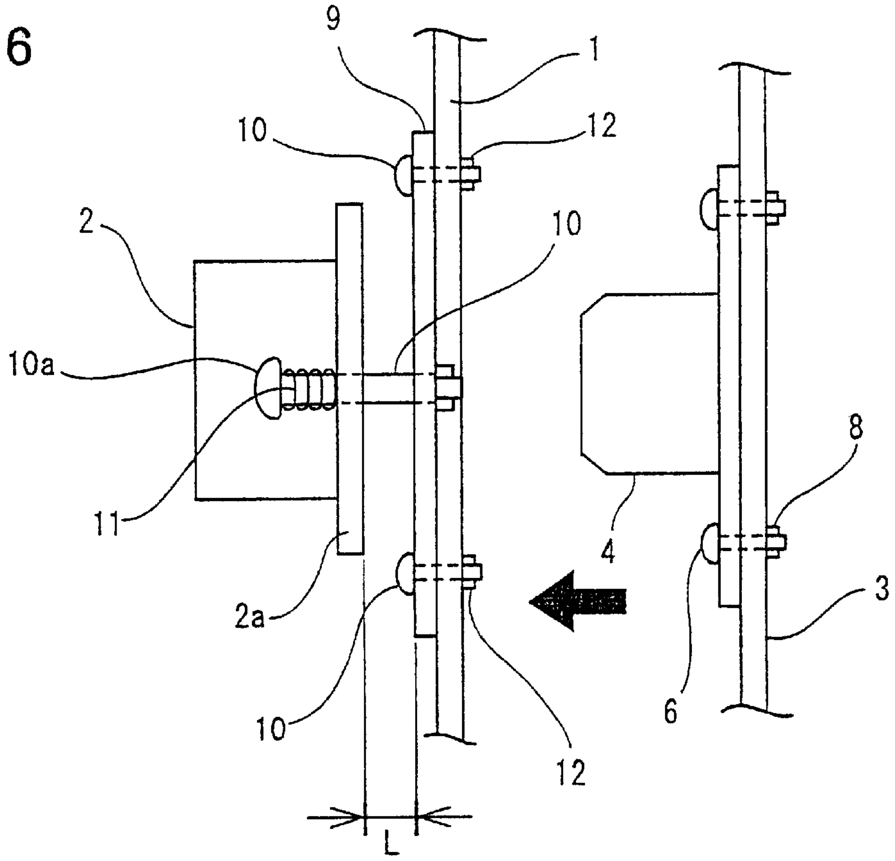
(PRIOR ART) FIG. 6
FIG. 6 is a schematic diagram illustrating another conventional construction.

Further, as shown in FIG. 4, when the connectors 20A, 20B and 20C are arranged in parallel, it is possible to provide a single large base plate 25' and to assemble the connectors 20A–20C to the base plate 25' by using bolts 30' having springs mounted thereon in advance.

In the above-described embodiment, the base plate and the connector are assembled by using bolts. However, it is possible to use any elongate member, such as a rivet, instead of the bolt.

As clearly described above, according to the present invention, a connector that is to be movably mounted on a panel via a spring is assembled to a base plate by using a bolt having a spring mounted thereon so that the connector and the base plate are integrated into a unit prior to mounting the connector on the panel. Accordingly, when the connector is mounted on a panel, the base plate is simply fixed on the panel. Thus, the mounting operation of the connector on the panel becomes easier than prior constructions. Further, the cost of the mounting operation can be substantially reduced.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. HEI 11-339949, filed on Nov. 30, 1999, which is herein expressly incorporated by reference in its entirety.

What is claimed is:

1. A method of mounting a connector of a pair of connectors that are respectively mounted on a stationary panel and a movable panel, and that engage with one another, a first connector of the pair of connectors being directly fixed to one of the stationary panel and the movable panel, a second connector of the pair of the connectors being movably mounted on the other of the stationary panel and the movable panel via a spring, said method comprising:

integrating said second connector with a base plate to form an assembly, prior to mounting of the base plate on one of the stationary panel and the movable panel, by using a bolt provided with said spring prior to mounting said second connector on the one of the stationary panel and the movable panel, said base plate being provided between said second connector and one of the stationary panel and the movable panel, said assembly comprising:

said second connector having a flange portion that extends from an outer periphery of said second connector, said flange portion having a first through hole, said base plate having a second through hole that is aligned with said first through hole, and said bolt having the spring, being inserted into said first and second through holes; and fixing said base plate of said assembly to the one of the stationary panel and the movable panel so as to movably mount said second connector on the one of the stationary panel and the movable panel without further mounting operation of the second connector to one of the stationary panel and the movable panel after the fixing of said base plate.

2. The method of mounting a connector according to claim 1, wherein said second connector is movably mounted on the stationary panel via said spring, and said first connector is fixedly mounted on the movable panel.

3. The method of mounting a connector according to claim 1, wherein said second connector is movably mounted on the movable panel via said spring, and said first connector is fixedly mounted on the stationary panel.

4. The method of mounting a connector according to claim 1, wherein said first connector comprises a plurality of first connectors and said second connector comprises a plurality of second connectors, each plurality of first connectors engaging with each plurality of second connectors, and wherein said plurality of second connectors are mounted on a single base plate.

5. The method of mounting a connector according to claim 1, wherein said spring extends between said flange portion of said second connector and an end of said bolt extending from said flange portion of said second connector, and a nut threaded onto said end of said bolt to secure said base plate to said one of the stationary panel and the movable panel.

6. The method of mounting a connector according to claim 1, wherein said spring extends between a head portion of said bolt and said flange portion of said second connector, and wherein a nut is threaded onto an end of said bolt extending from said base plate to secure said base plate to said one of the stationary panel and the movable panel.

7. A method of mounting a connector of a pair of connectors that are respectively mounted on a stationary panel and a movable panel, and that engage with one another, a first connector of the pair of connectors being directly fixed on one of the stationary panel and the movable panel, a second connector of the pair of the connectors being movably mounted on the other of the stationary panel and the movable panel via a spring, said method comprising:

first, aligning a first through hole provided in a flange portion extending from an outer periphery of said second connector, with a second through hole provided in a base plate provided between said second connector and one of the stationary plate and the movable plate;

second, inserting a bolt having said spring into said first and second through holes aligned each other so that said spring extends between an end of said bolt extending from said flange portion and the flange portion; and third, fixing said base plate on the one of the stationary panel and the movable panel.

8. The connector mounting method according to claim 7, wherein said base plate is fixed on the stationary panel to movably mount said second connector on the stationary panel via said spring, and said first connector is fixedly mounted on the movable panel.

* * * * *